July 21, 1970
W. H. PETERSON
3,521,052
VEHICLE SPEED CONTROL DEVICE
Filed Dec. 29, 1967
4 Sheets-Sheet 1
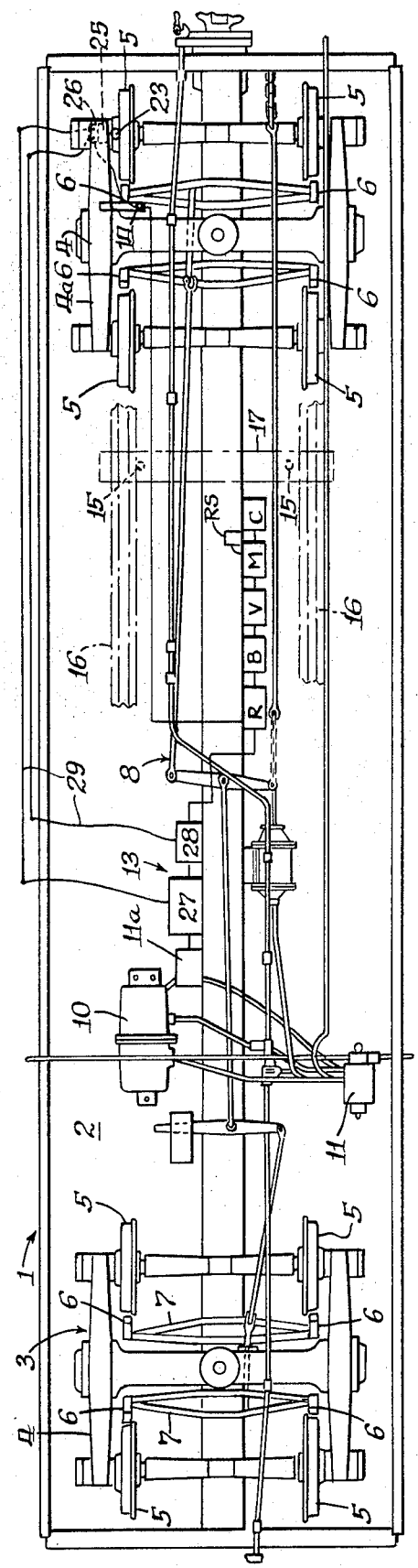
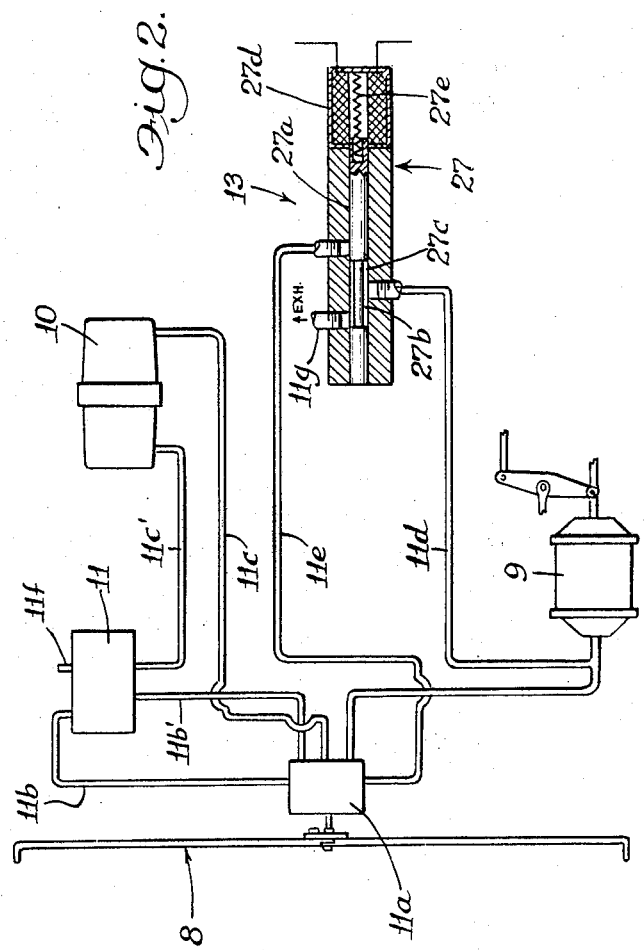
Inventor:
William H. Peterson
By Richard J. Myers
Atty.

July 21, 1970 W. H. PETERSON 3,521,052
VEHICLE SPEED CONTROL DEVICE
Filed Dec. 29, 1967 4 Sheets-Sheet 2

DEVICE TRIPPED, SPEED IS
BETWEEN 4 AND 16 M.P.H.

o————— CURRENT CIRCUITRY PATH - POSITIVE SIDE
o-x-x-x-x- CURRENT CIRCUITRY PATH - NEGATIVE SIDE

Inventor:
William H. Peterson
By Richard J. Myers
Atty.

20 M.P.H. OR MORE

○────── CURRENT CIRCUITRY PATH – POSITIVE SIDE
○─✕─✕─✕─ CURRENT CIRCUITRY PATH – NEGATIVE SIDE

Inventor:
William H. Peterson
By: Richard J. Myers
Atty

United States Patent Office 3,521,052
Patented July 21, 1970

3,521,052
VEHICLE SPEED CONTROL DEVICE
William H. Peterson, Homewood, Ill., assignor to Pullman Incorporated, Chicago, Ill., a corporation of Delaware
Filed Dec. 29, 1967, Ser. No. 694,705
Int. Cl. B61l *3/02*
U.S. Cl. 246—182                      31 Claims

ABSTRACT OF THE DISCLOSURE

An apparatus for controlling the coupling speed of a railroad car within the ladder track of a classification yard including a generator driven solenoid air valve to brake the car if it exceeds a maximum permissible coupling speed and a battery operated wheel driving motor to accelerate the car if it is moving too slow for coupling. The car carried speed control system is activated by a ground mounted trip.

CROSS REFERENCES TO RELATED APPLICATIONS

This application is related to my co-pending patent applications Ser. Nos. 694,435 and 694,447 both filed on Dec. 29, 1967.

BACKGROUND OF INVENTION

Field of invention

The field of art to which this invention pertains is to the railroad car impact speed control devices where it is desirable to control the speed of impact between two railroad cars coming into contact with one another and particularly to control the speed of impact of a moving railroad car with a standing railroad car in a ladder track of a switch yard for classification. It is desired to prevent damage to lading and cars as a result of coupling impacts of one railroad car against another. This is accomplished by controlling the coupling speed of the moving vehicle relative to the standing vehicle by the use of a control device.

Description of the prior art

There are two basic approaches to the problem of damage to cars and lading resulting from coupling impacts between cars during switching operations. One is to cushion the cars and the other is to control the speed of impacts. If impact speeds could be held to no more than 3 to 4 m.p.h., the problem would be practically eliminated. Up to now, the only means used by railroads for controlling car speeds during switching is the car retarder. These retarders slow a car down by extering a clamping force on the wheel rim over a certain length of track. The final objective is to start the car down each ladder track at 4 m.p.h. and then allow the non-accelerating grade in the yard to move the car down the track at this speed until it couples to cars already on the track. The grades in a flat switch yard are essentially the same as in a hump yard except that the cars are switched into the various ladder tracks with a locomotive instead of by rolling down a hump. The invention works to provide a device that can be applied to each car and utilize the car brakes to check excessive speed during switching and to accelerate the speed of the car if it is moving too slow for coupling with another car. At the turn of the decade, a conservative estimate shows that impact damage is in the hundreds of millions of dollars and could be over $100 a year for each car in service. This vehicle-mounted speed control device mounted on each car could eliminate such expenditures.

SUMMARY

It is the general object, purpose and advantage of this device to provide for an on-vehicle speed control device which is tripped by a ground-mounted tripping mechanism located in the path of the vehicle whereby the vehicle is conditioned so that it is either accelerated or decelerated to operate at a pre-determined maximum coupling speed within the ladder track of a switch yard for classification. The speed control device comprises a wheel-driven generator for supplying current to operate a solenoid air valve to deliver brake pressure to the vehicle braking system when the car exceeds the predetermined speed as determined by a speed responsive switch means. Should the vehicle speed fall below a pre-determined speed, a generator charged battery operates a vehicle driving motor to bring the vehicle back up to the pre-determined speed. Means are provided for terminating operation of the speed control device as soon as the car couples with other standing cars and comes to rest. Further means are provided which control the polarity of the generator and motor as well as means for regulating the voltage of the battery during charging. These and other objects, advantages and purposes will become apparent from reference to the following description and drawings.

BRIEF DESCRIPTION OF THE DRAWINGS

FIG. 1 is a bottom plan view of the railroad car embodying my invention;

FIG. 2 is a schematic view of the pneumatic circuitry incorporating the novel combination of the components of my invention;

DESCRIPTION OF THE PREFERRED EMBODIMENT

Figure 3:
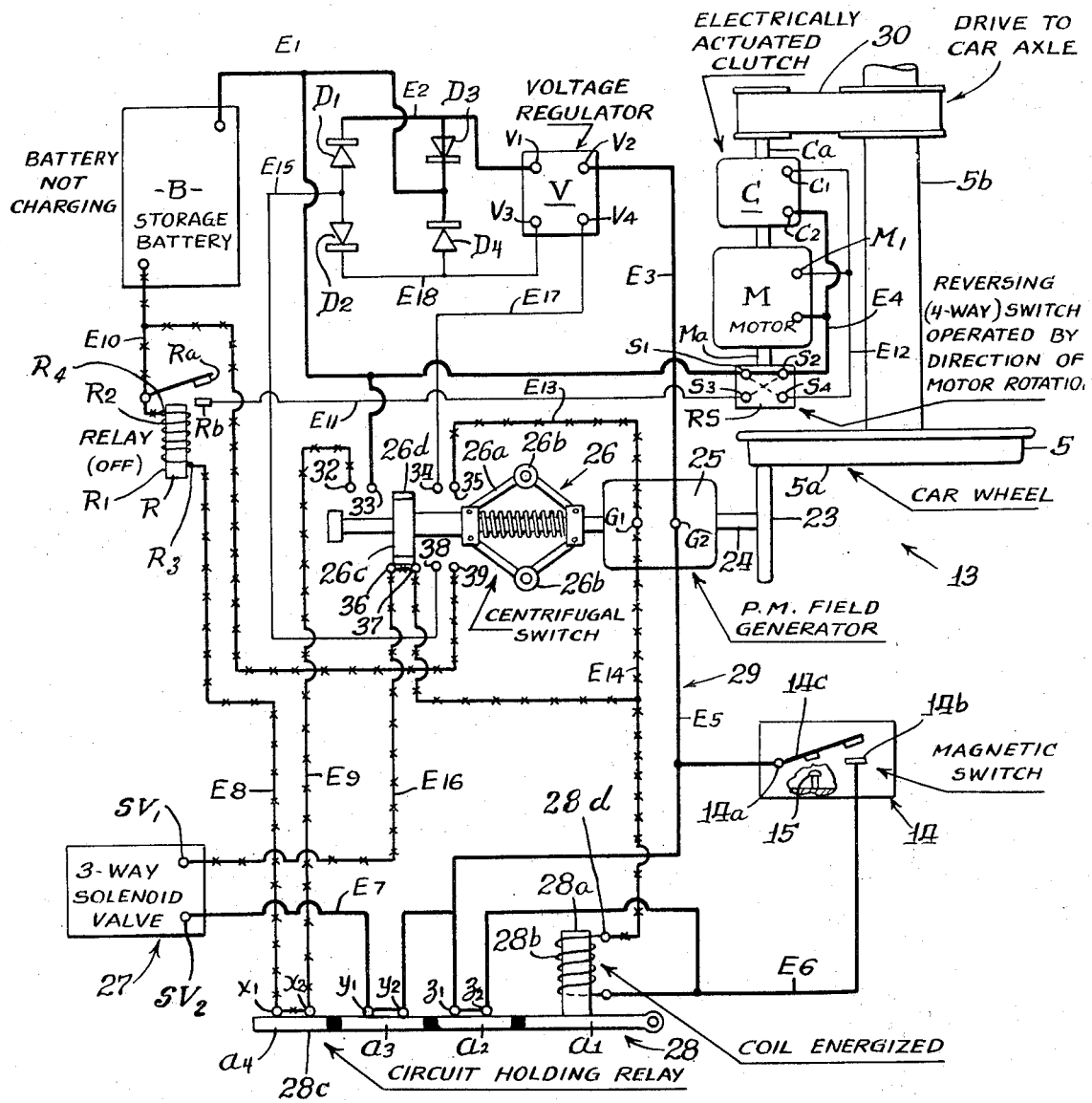
FIG. 3 is a schematic view of the electrical circuitry incorporating the novel combination of components of the inventive speed control device at operational speeds between 4 and 16 miles per hour (m.p.h.)

With reference now to the drawings, FIG. 1–3, there is shown a railroad box car 1, such as shown in my co-pending patent applications, Ser. Nos. 694,435 and 694,447 both filed on Dec. 29, 1967, and each entitled "Vehicle Speed Control Device." The car 1 has an underside 2 carried by trucks 3 having truck structure 4. Each pair of wheels 5 have an axle 5a and are stopped by brake showes 6 carried by brake beams 7 operated by braking linkage or rigging 8 operated by brake cylinder 9 supplied with air pressure from reservoir 10 via the conventional AB valve 11 and a reservoir isolating valve 11a. The valve 11a may be operated by the brake release rod 12 for placing the reservoir 10 by way of reservoir isolating valve 11a in communication with the speed control device 13. As seen in FIG. 3, air lines 11b, 11b', 11c, 11c', 11d, 11e, 11f and 11g supply pressurized air between the reservoir 10, the valves 11 and 11a, the cylinder 9 and the speed control valve 27 as more fully disclosed in the co-pending application above referred to.

As seen in FIGS. 1–3 there is provided an on-vehicle mounted speed control device 13 and a vehicle mounted magnetic switch or momentary switch or starter 14 operated by a magnetic spike 15 mounted in the cross tie 17 between the rails 16.

Figure 4:
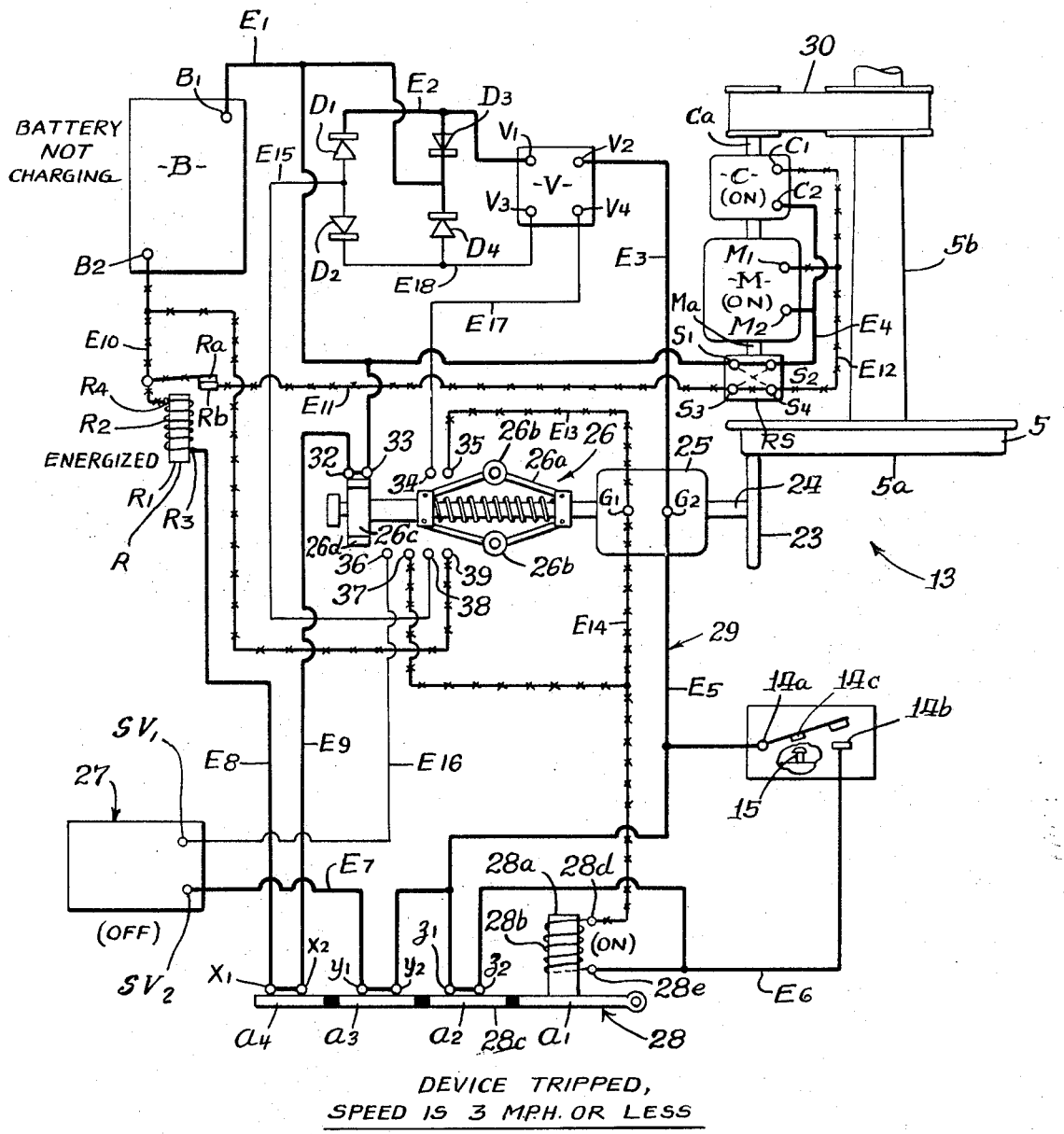
FIG. 4 is a view like FIG. 3 but at operational speeds below 4 m.p.h.

The magnetic switch 14 is mounted on the underside of the side frame 4a. As seen in FIG. 3, the speed control device 13 includes the wheel driven generator or air supply means operator 25, the speed responsive switch or speed responsive centrifugal switch means or speed responsive means 26, the solenoid air valve solenoid actuated air supply means 27, the relay or first relay means or first holding means or starter means 28, the motor or vehicle drive means M, the storage battery or power source B, voltage regulator V, electrically actuated clutch or couple means C, reversing switch RS, second relay means R, diode $D_1$, $D_2$, $D_3$ and $D_4$, belt drive 30 and attendant pneumatic and electrical circuit structure therefor. The generator 25, magnetic switch 14 and speed responsive switch 26 are truck mounted and the remaining aforementioned speed control device components are mounted on the underframe as seen in FIG. 1. The mounting of the speed control components may be similar to that shown in my aforesaid co-pending applications. The drive wheel 23 engages the rim 5a to drive through shaft 24 the electric generator 25 and the speed responsive switch or centrifugal switch 26. When electric current supplied by the generator 25 is supplied to the solenoid operated speed control valve 27, air is admitted to the brake cylinder 9 for operation of the vehicle brake shoes (as shown in FIG. 4) to be explained later. The relay arrangement 28 is energized when the magnetic switch 14 is tripped by the ground (between tracks 16) mounted magnetic spike 15 to close the circuit.

The magnetic switch 14 comprises terminal 14a, contact 14b, and magnetically sensitive arm and contact 14c drawn to contact 14b when passing over spike 15 for completing portion of circuit 29 at magnetic switch 14. The wheel 5 drives generator and speed responsive switch wheel 23 which drives shaft 24. The shaft 24 drives the generator 25 and centrifugal switch 26 respectively. The electrical generator is conventional and is of the small permanent magnet field type. The solenoid operated speed control valve 27 has a spool 27a in its housing movable by solenoid 27d against spring 27e when energized to admit air into passage 27c about grooved portion 27b from the isolating valve 11a for passage of air to brike cylinder 9. When the solenoid 27d is de-energized, air flow to the brake cylinder is blocked and the exhaust port opened to release pressure in the brake cylinder. The generator, speed control valve, magnetic switch and spikes 15 (there being one on each inside of each rail 16 of the track for tripping the magnetic switch 14 regardless of which way the car enters the ladder track) are similar in construction and arrangement to those components shown in my co-pending patent application having Ser. No. 694,447.

Figure 5:
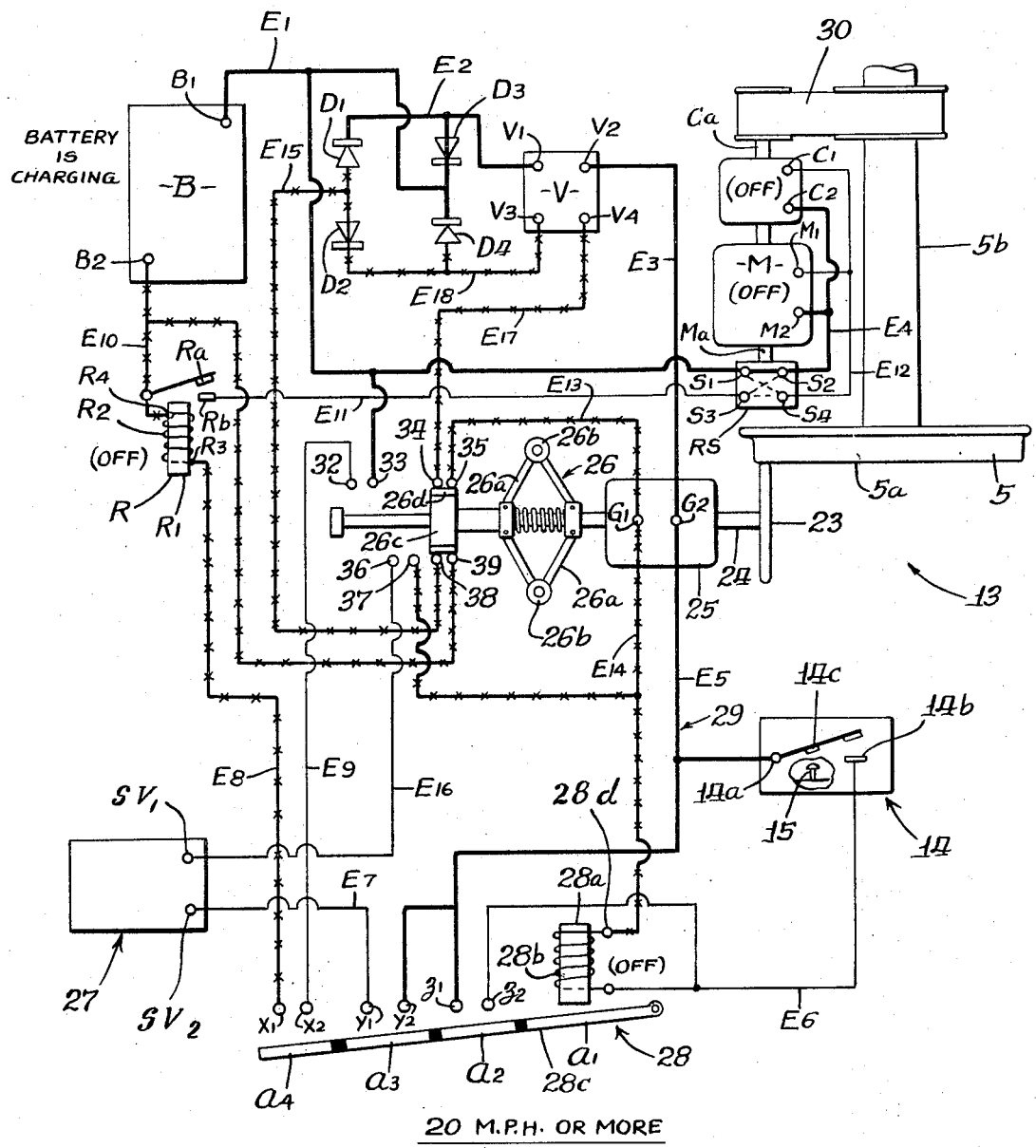
FIG. 5 is a view like FIGS. 3 and 4 but at operational speeds of 20 m.p.h. or more.

The speed responsive switch means 26 is also similar in arrangement and in function to the centrifugal means or governor means of my above mentioned co-pending application, Ser. No. 694,447. The switch means comprises a centrifugal switch governor 26a provided with speed responsive governor weights 26b thrown outwardly by rotation of the shaft 24 such that the weights move switch arm 26c to have electro conductive circumferential band or circuit closing means or selector means 26d engage contact terminals 36, 37 (see FIG. 3) to energize the solenoid valve 27 when the car speed is between 4 m.p.h and 16 m.p.h. However, when the car is traveling at a speed of 3 m.p.h. or less, as seen in FIG. 4, the band 26d of switch 26 engages terminals 32 and 33 whereby the battery B operates electric motor M and energized clutch C which through their shafts $M_a$ and $C_a$ drives the belt means 30 to rotate axle 5a to bring the car speed up to 4 m.p.h. When the car is traveling at a speed of 20 m.p.h. the band 26d of the switch 26 engages the terminals 34, 35, 38 and 39 to make the generator output available to the battery for charging, as seen in FIG. 5.

The circuit holding relay means 28 is similar to that shown in my aforementioned co-pending application, Ser. No. 694,447, but is adapted also to provide suitable circuitry for driving the car should its speed fall below 3 m.p.h. and charging the battery when the car speed is 20 m.p.h. or more. The relay means 28 comprises a core 28a, a coil 28b, a pivotal arm 28c provided with electroconductive terminal portions $a_1$, $a_2$, $a_3$ and $a_4$ for completing portions of the electrical circuit 29 when having contact with circuit electrical terminals $x_1$, $x_2$, $y_1$, $y_2$, $z_1$ and $z_2$. As seen in FIGS. 3 and 4, the relay means 28 is energized to swing the arm 28c in the upper terminal contacting position since the core 28a draws the arm 28 to it; whereas in FIG. 5 the coil 28b is off or de-energized, the arm 28c having moved from core 28a to break contact with the terminals $x_1$, $x_2$, $y_1$, $y_2$, $z_1$ and $z_2$.

The relay R of the electrical speed control device 13 comprises core $R_1$ and a coil $C_2$ and relay contact terminals $R_a$ and $R_b$. The relay R is operative, as seen in FIG. 4, when energized to connect the storage battery B with the electric motor M for driving the car; whereas in FIGS. 3 and 5 the relay is de-energized where the battery is charged, or is not connected to the motor M respectively. The circuitry 29 is provided with conventional silicon dioxide diodes $D_1$, $D_2$, $D_3$ and $D_4$ which are the means whereby the battery is being charged by the generator, no matter which way the car runs the polarity or direction of current travel of the generator is controlled, as the polarity of the generator can be reversed but the battery polarity is always the same. The operation of the conventional voltage regular V limits the maximum voltage delivered to the storage battery B. The conventional reversing switch RS adjusts for the uni-directional polarity of the battery regardless of which direction the car is moving to provide means for operating the motor in the same direction the car is moving. The clutch C applies a torque by the power of the battery B sufficient to run the car up to 4 m.p.h. and mechanically connects the motor with the car axle only when it is supplied with electric current for its operation.

The electrical connections between the terminals of the electrical components of circuit 29 are as follows: electrical line $E_1$, connects battery terminal B, to diodes $D_3$ and $D_4$ and reversing switch terminal RS, and centrifugal switch terminal 33; electrical line $E_2$ connects diode $D_1$ to diode $D_3$ and voltage regulator terminal $V_1$; electrical line $E_3$ connects voltage regulator $V_2$ to generator terminal $G_2$; electrical line $E_4$ connects reversing switch terminal $S_2$ to motor terminal $M_2$ and clutch terminal $C_2$; electrical line $E_5$ connects generator terminal $G_2$ to magnetic switch terminal 14a and relay arm terminal $Z_1$ and relay arm terminal $Y_2$; electrical line $E_6$ connects magnetic switch terminal 14b to relay coil terminal 28e and relay arm terminal $Z_2$; electrical line $E_7$ connects relay arm terminal $Y_1$ to solenoid valve terminal $SV_2$; electrical line $E_8$ connects relay arm $X_1$ to relay coil terminal $R_3$; electrical line $E_9$ connects relay arm terminal $X_2$ to centrifugal switch terminal 32; electrical line $E_{10}$ connects battery terminal $B_2$ to relay coil terminal $R_4$ to centrifugal switch terminal 39 and to relay switch arm terminal $R_a$; electrical line $E_{11}$ connects switch arm terminal $R_b$ to reversing switch terminal $S_3$; electrical line $E_{12}$ connects reversing switch terminal $S_4$ to motor terminal $M_1$ and clutch terminal $C_1$; electrical line $E_{13}$ connects centrifugal switch terminal 35 to generator terminal $G_1$; electrical line 14 connects generator terminal $G_1$ to centrifugal switch terminal 37 and relay coil terminal 28d; electrical line $E_{15}$ connects diode $D_1$ to diode $D_2$ and centrifugal switch terminal 38; electrical line $E_{16}$ connects centrifugal switch terminal 36 to solenoid valve terminal $SV_1$; electrical line $E_{17}$ connects centrifugal switch terminal 34 to voltage regulator terminal $V_4$; electrical line $E_{18}$ connects voltage regulator terminal $V_3$ and diodes $D_2$ and $D_4$. As the car enters the ladder track of a switch yard, the magnetic switch 14 is tripped by the tripper or magnetic spike 15 to close contact arm 14c against the contact terminal 14b energizing the circuit holding relay arrangement 28 to place the relay arm 28c in the up closed position for placing the terminals $x_1$, $x_2$, $y_1$, $y_2$, $z_1$ and $z_2$ in electrical contact with the respective electro-conductive arm portions $a_4$, $a_3$ and $a_2$, the arm portion 28c being held to the core 28a. If the car is travelling at a speed that is between 4 and 16 m.p.h. the solenoid valve 27 is energized by the generator 25 as the centrifugal switch 26 has its band 26d in contact with terminals 36 and 37. The relay R is off and the battery B is not charging and the electrically actuated clutch C is off, as is the motor M. The car brakes are applied until the speed of the car falls below 4 m.p.h. This operation is shown by FIG. 3. Should car speed fall to 3 m.p.h. or less, the band 26d of the centrifugal switch 26 moves to the position shown in FIG. 4 Where the battery is still not charging but the relay R is energized. The circuit holding relay 28 is still energized and the battery B is supplying a current to the electric clutch C and the motor M which, through the belt drive means 30, drives the wheels 5 of the car until the car reaches a speed of 4 m.p.h. The solenoid valve 27 is de-energized so no brake pressure is being applied to the car brakes. The generator 25 is being driven by the car wheel 5 to maintain the circuit holding relay 28 in the closed circuit position. When the car impact couples with a standing car in the ladder track at the approximate speed of 4 m.p.h., a lading damage-free speed, the moving car comes to a halt and the generator 25 ceases to generate a current and the circuit holding relay means 28 is de-energized, as is the relay R and solenoid valve 27, and no current is then supplied by the battery to drive the motor or actuate the clutch and the operation of the speed control device ceases. The magnetic switch 14 is a momentary close type switch which remains closed for only a moment of time in passing over the tripping structure of spike 15. The battery B is not charging. In mainline service operations where the car is travelling at a speed of 20 m.p.h. or more, the battery B is charged by the generator 25 as the band 26d of the centrifugal switch 26 is in contact with terminals 34, 35, 38 and 39 to complete the circuit between the generator 28 and the storage battery B. The voltage regulator V limits the maximum charge the battery will take. Both relays means 28 and R, the solenoid valve 27, the electrically actuated clutch and the electric motor M are de-energized or in the "off" condition. This condition is shown by FIG. 5.

In each of the FIGS. 3, 4 and 5 the current circuitry path leading from the positive side of the battery is indicated by a heavy dark line and the current circuitry path leading from the negative side of the battery is indicated by a line having crosses on it. This is intended as a useful guide in following the various operations of the speed control devices.

Thus there is provided a novel car speed control device that maintains the car speed at a substantially predetermined speed by accelerating or decelerating the car as required in the ladder track for soft impact coupling and wherein at higher speeds the car battery is charged.

The foregoing description and drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:
1. A speed control device for controlling the speed of a vehicle, comprising:
 a generator operated by vehicle movement,
 a first relay means having a momentary switch tripped from open to closed positions by an off-vehicle tripping means,
 said first relay means connecting with said generator and said momentary switch and energized by the generator to remain in a closed position when said momentary switch is momentarily closed by said tripping means and said first relay means remaining in the closed position,
 a speed responsive centrifugal switch means driven by vehicle movement and having circuit closing means movable to one of three positions in accordance with one of three vehicle speeds,
 a solenoid actuated air supply means for supplying air pressure for braking the vehicle speed and being operatively connected with said generator and said first relay means and said centrifugal switch means by said circuit closing means in the first position of said circuit closing means for braking vehicle speed when the first vehicle speed is attained,
 a battery,
 an electric motor operated by the battery and adapted to drive the vehicle should the vehicle speed fall below the first speed to a second lower speed,
 electrically actuated clutch means connected with the battery for drivingly connecting the motor with the vehicle drive,
 second relay means operatively connected with the battery and the first relay means for having the battery operate the motor and engage the clutch means when the second relay means is energized,
 the circuit closing means of said centrifugal switch means in moving to the second position at the second lower vehicle speed de-energizing said air supply means, energizing said second relay means and operating said motor and engaging said clutch means for vehicle drive until said second speed is exceeded, and
 the circuit closing means of said centrifugal switch means in moving to the third position as the third and highest vehicle speed is attained, de-energizing both relay means, and connecting said generator with said battery to charge said battery, and said motor and clutch means and said solenoid are de-energized.

2. The invention according to claim 1, and
diode means being provided in the circuit between the battery and the generator for maintaining the battery polarity uni-directional regardless of the polarity of the generator.

3. The invention according to claim 1, and
voltage regulator means connected between the battery and the generator for limiting the maximum voltage of the battery when the generator is charging the battery.

4. The invention according to claim 1, and
reversing switch means provided between the battery and generator and the motor and the clutch means for supplying electrical current from the battery to the motor and the clutch means or from the generator to the battery regardless of the direction of travel of the vehicle.

5. A speed control device for controlling the speed of a vehicle, comprising:
 an air supply means operator,
 a first holding means having a starter tripped from open to closed positions by an off-vehicle tripping means,
 said first holding means connecting with said operator and said starter and activated by the operator to remain in a closed position when said starter is closed by said tripping means and said first holding means remaining in the closed position,
 a speed responsive means driven by the vehicle movement and having closing means move to one of three positions in accordance with one of three vehicle speeds,
 air supply means for supplying air pressure to brake the vehicle speed and being operatively connected with said operator, and said first holding means and said speed responsive means by said closing means in the first position of said closing means for braking vehicle speed when the first vehicle speed is attained,
 a power source, vehicle drive means operated by the power source to drive the vehicle should the vehicle speed fall below the first speed to a second lower speed, couple means for connecting the drive means with the vehicle drive, second holding means in the first position operatively connected with the power source and the first holding means for having the power source operate the drive means and engage the couple means when the second holding means is energized, the closing means of said speed responsive means in moving to the second position at the second lower speed de-activating said air supply means, and activating said second holding means and said first holding means, and operating said vehicle drive means, and engaging said couple means for vehicle drive until said second speed is exceeded, and the closing means of said speed responsive means, in moving to the third position, as the third and highest speed is attained de-activating both holding means, and connecting said operator with said power source to charge said power source, and said drive means and couple means and said air supply means are de-activated in attaining a third speed which is higher than said first speed.

6. A speed control device for controlling the speed of a vehicle, comprising:

an air supply means operator and speed responsive means driven by vehicle movement, starter means tripped from open to closed positions by an off-vehicle tripping means, said starter means connecting with said operator and speed responsive means and activated by the operator and speed responsive means to remain in a closed position, said operator and speed responsive means having selector means movable to one of two positions in accordance with one of two vehicle speeds, air supply means for supplying air under pressure to brake the vehicle speed and being operatively connected with said operator and speed responsive means and starter means by said selector means in the first position of said selector means for braking vehicle speed when the first vehicle speed is attained, a power source, vehicle drive means operated by the power source to drive the vehicle should the vehicle speed fall below the first speed to a second lower speed, the selector means of said operator and speed responsive means in moving to the second position at the second lower speed de-activating said air supply means, drivingly connecting the power source with the drive means and operating said vehicle drive means for vehicle drive until said second speed is exceeded.

7. The invention according to claim 6, and said operator and speed responsive means comprising a vehicle driven power means.

8. The invention according to claim 6, and said operator and speed responsive means comprising an electric generator and said air supply means having means energized by the generator to operate the air supply means to admit pressurized air to the vehicle brake system for braking the vehicle speed when the pre-determined vehicle speed is reached.

9. The invention according to claim 6, and said air supply means having an energizing element and said operator and speed responsive means including a speed responsive switch, said operator and speed responsive means including generator means, said speed responsive switch means connecting the generator means with the air supply means energizing element upon reaching of the pre-determined speed to operate the air supply means to admit pressurized air to brake vehicle speed.

10. The invention according to claim 6, and said starter means including an on-vehicle starter tripped by an off-vehicle tripper as the vehicle passes thereby.

11. The invention according to claim 6, and said operator and speed responsive means including a vehicle driven power source, and said starter means including a starter switch means for connecting said power source with the air supply means for opening same to cause braking of the vehicle.

12. The invention according to claim 11, and said power source including electric means for supplying a current and said air supply means including a solenoid valve being energized by said electric means when the starter switch means completes the circuit with the electric means and the valve.

13. The invention according to claim 11, and said starter switch means including a momentary switch to open the air supply means to the vehicle brake means only when the switch is tripped as the vehicle passes by off-vehicle switch tripping means.

14. The invention according to claim 11, and said starter switch means including a ground actuated momentary switch which is closed only during the time the vehicle passes by an off-vehicle mounted switch tripper and holding relay means energized by closing of said momentary switch for the power source to open the air supply means as long as the power source is operating.

15. The invention according to claim 6, and said operator and speed responsive means including an electric generator driven by movement of the vehicle to energize and move the air supply means to the vehicle braking position.

16. The invention according to claim 6, and said operator and speed responsive means including a vehicle driven electric generator supplying current to energize said air supply means to move to the vehicle brake position, and a vehicle driven speed responsive switch for closing the generator to the air supply means circuit for energizing the air supply means when the vehicle exceeds the pre-determined speed, the generator supplying sufficient current to the air supply means the moment the speed responsive switch closes.

17. The invention according to claim 16, and said air supply means including a solenoid valve energized by said generator.

18. The invention according to claim 6, and an off-vehicle ground-mounted tripping means for actuating said starter means.

19. The invention according to claim 14, and an off-vehicle ground-mounted tripping means for actuating said momentary switch.

20. The invention according to claim 19, and said momentary switch being magnetically sensitive and said tripping means being a magnetic element.

21. The invention according to claim 6, and said power source including a battery.

22. The invention according to claim 6, and said vehicle drive means including an electric motor.

23. The invention according to claim 22, and said vehicle drive means including an electric clutch engageable with said motor for driving said vehicle.

24. The invention according to claim 6, and second starter means operatively connected with the power source and the first mentioned starter means for having the power source operate the vehicle drive means.

25. The invention according to claim 24, and said second starter means including a holding relay means and said power source including a storage battery, and said operator and speed responsive means including a generator, said relay means being energized in the second position of the selector means for having current supplied by said battery to vehicle drive means to said battery.

26. The invention according to claim 24, and
said power source including a storage battery, said operator and speed responsive means including a generator, and
said selector means of the operator and speed responsive means having a third and high vehicle speed position connecting the generator with the battery for battery charging.

27. The invention according to claim 6, and
diode means being provided in the circuit between the battery and the generator for maintaining the battery polarity uni-directional regardless of the polarity of the generator, and
said power source including a battery ands aid operator and speed responsive means including a generator.

28. The invention according to claim 6, and
voltage regulator means connected between the battery and the generator for limiting the maximum voltage of the battery when the generator is charging the battery, and
said power source including a battery and said operator and speed responsive means including a generator.

29. The invention according to claim 6, and
said power source including a battery and said operator and speed responsive means including a generator, and
said vehicle drive means including a motor and clutch, reversing switch means provided between the battery and generator and the motor and clutch for supplying electrical current from the battery to the motor and clutch or from the generator to the battery regardless of the direction of travel of the vehicle.

30. In a vehicle having an air brake system for supplying air under pressure to the vehicle brake cylinder from a reservoir,
a speed control device for controlling the speed of a vehicle, comprising:
an air supply means operator and speed responsive means driven by vehicle movement,
starter means tripped from open to closed positions by an off-vehicle tripping means,
said starter means connecting with said operator and speed responsive means and activated by the operator and speed responsive means to remain in a closed position,
said operator and speed responsive means having selector means movable to one of two positions in accordance with one of two vehicle speeds,
air supply means for supplying air under pressure to brake the vehicle speed and being operatively connected with said operator and speed responsive means and starter means by said selector means in the first position of said selector means for braking vehicle speed when the first vehicle speed is attained,
a power source,
vehicle drive means operated by the power source to drive the vehicle should the vehicle speed fall below the first speed to a second lower speed,
the selector means of said operator and speed responsive means in moving to the second position at the second lower speed de-activating said air supply means, drivingly connecting the power source with the drive means and operating said vehicle drive means for vehicel drive until said second speed is attained.

31. The invention according to claim 30, and
reservoir isolating valve means interposed between the reservoir and the speed control device,
said valve having a reservoir isolating position in service and having an air supply position to the air supply means for speed control operation.

References Cited

UNITED STATES PATENTS

| | | | |
|---|---|---|---|
| 2,582,316 | 1/1952 | Doehler | 246—182 X |
| 3,192,382 | 6/1965 | Allison | 246—182 X |

ARTHUR L. LA POINT, Primary Examiner

G. H. LIBMAN, Assistant Examiner

U.S. Cl. X.R.

246—287